(12) United States Patent
Powell

(10) Patent No.: US 8,042,388 B2
(45) Date of Patent: Oct. 25, 2011

(54) MULTI-JOINT FUEL LEVEL SENDER GAGE ASSEMBLY

(75) Inventor: Patrick Powell, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 449 days.

(21) Appl. No.: 12/411,214

(22) Filed: Mar. 25, 2009

(65) Prior Publication Data

US 2010/0242597 A1    Sep. 30, 2010

(51) Int. Cl.
   *G01F 23/30* (2006.01)
   *G01F 23/32* (2006.01)

(52) U.S. Cl. .......................................... 73/311; 73/317

(58) Field of Classification Search .................. 73/305, 73/306, 311, 317, 322.5
   See application file for complete search history.

(56) References Cited

U.S. PATENT DOCUMENTS

| | | | |
|---|---|---|---|
| 1,746,828 A * | 2/1930 | Gelatt ............................... | 73/311 |
| 2,516,452 A * | 7/1950 | De Giers et al. ................ | 73/311 |
| 4,081,638 A * | 3/1978 | Thorn et al. ................ | 200/84 R |
| 4,194,396 A | 3/1980 | Ohsawa et al. | |
| 4,562,734 A | 1/1986 | Kobayashi | |
| 6,370,951 B1 * | 4/2002 | Kerchaert et al. ............... | 73/311 |

FOREIGN PATENT DOCUMENTS

| JP | 55002966 A | * | 1/1980 |
|---|---|---|---|
| JP | 61025025 A | * | 2/1986 |

* cited by examiner

*Primary Examiner* — Hezron E Williams
*Assistant Examiner* — Nathaniel Kolb
(74) *Attorney, Agent, or Firm* — Harness, Dickey & Pierce, PLC

(57) ABSTRACT

A fuel level measuring system for a liquid fuel tank may utilize a primary sender gage assembly employing at least a primary sender gage, a primary sender arm, and a primary sender float. The system may further utilize a secondary sender gage assembly employing at least a secondary sender gage, a secondary sender arm, and a secondary sender float. A dash indicator may display a fuel level of fuel within the fuel tank based upon resistances from the sender gages. The primary sender float and the secondary sender gage are contained within a single unit that is buoyant in liquid fuel. The fuel tank may have a top dome portion and a bottom dome portion that the secondary sender float is capable of occupying while the sender gages transmit a signal corresponding to fuel levels in the tank.

18 Claims, 3 Drawing Sheets

MULTI-JOINT FUEL LEVEL SENDER GAGE ASSEMBLY

FIELD

The present disclosure relates to an apparatus for measuring fuel levels in a fuel tank, and more particularly, to an apparatus for measuring fuel levels in a fuel tank with a non-rectangular shape.

BACKGROUND

This section provides background information related to the present disclosure which is not necessarily prior art. Most modern vehicles, such as automobiles, are equipped with fuel tanks to carry on-board liquid fuel for use in an on-board internal combustion engine, which is used to power the vehicle. Because the liquid fuel in the tank is depleted with use of the internal combustion engine, most fuel tanks are equipped with an in-tank sender gage to indicate the level of fuel to a driver at all times. While most gages are satisfactory for their given applications, many fuel tanks on cars today are made from plastic and to a lesser extent steel, and are molded to fit into very tight spaces, such as around the car body, frame or other components. Because of the varying geometry of modern fuel tanks, traditional fuel gages do not provide accurate readings for all or most levels of fuel within the modern tanks.

FIG. 7 depicts a prior art arrangement of a fuel sender gage 100 arranged on a side of a fuel pump module reservoir 102. The fuel sender gage 100 has a fuel sender arm 104 with one end of the fuel sender arm 104 attached to the fuel sender 100 and a second end of the fuel sender arm attached to a float 106. In the existing art, float 106 is able to travel between bottom 108 of fuel tank 110 to a maximum position noted by float 106, when fuel sender arm 104 moves a maximum position noted as angle Tmax. Float 106 remains within base rectangular structure 112, or non-domed area 112, of the fuel tank 110 and does not move into dome area 118 of fuel tank 110. Even when the fuel tank 110 is filled, and fuel occupies area 114 of the fuel tank 110, the position noted by float 106 remains unchanged. Thus, fuel sender gage 100 does not register a change in fuel level until fuel level 116, which occupies dome area 118, decreases to fuel level 120 or lower. The inability to measure a fuel level beyond fuel level 120 is a limitation of the current art.

SUMMARY

This section provides a general summary of the disclosure, and is not a comprehensive disclosure of its full scope or all of its features. A fuel level measuring system for a fuel tank may employ a primary sender gage assembly that may at least utilize a primary sender gage, a primary sender arm, and a primary sender float. The fuel level measuring system may further employ a secondary sender gage assembly that may at least utilize a secondary sender gage, a secondary sender arm, and a secondary sender float. The primary sender gage and the secondary sender gage may communicate a resistivity level from a variable resistor to a vehicle control module. A dash indicator may then display a fuel level of fuel within the fuel tank.

The primary sender float and the secondary sender gage may be contained within a single unit that is buoyant in liquid fuel such as gasoline, diesel fuel, kerosene, etc. The primary sender gage assembly and the secondary sender gage assembly are located within the fuel tank. The fuel tank may have a top dome portion and a bottom dome portion that are separate from a basic square or rectangular fuel tank. The secondary sender float 46 is capable of occupying the top dome portion and the bottom dome portion to register a resistivity with the second sender gage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
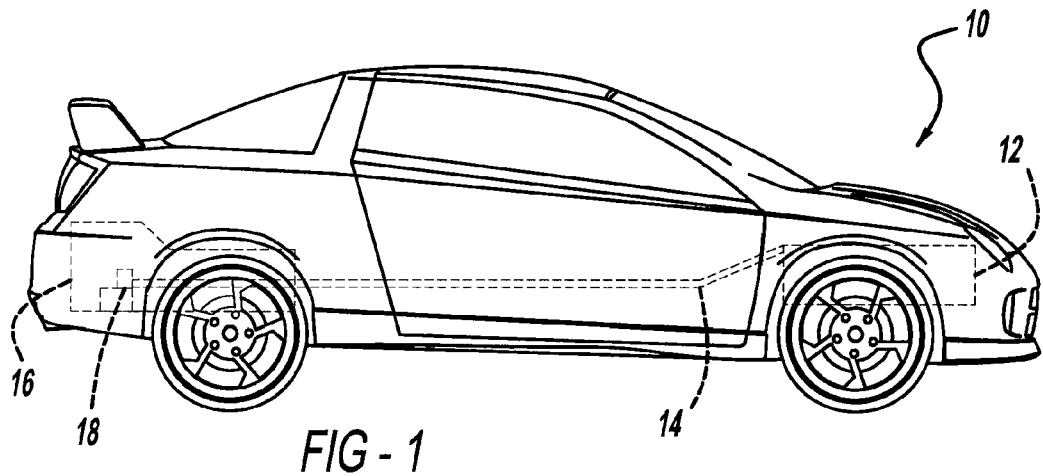
FIG. 1 is a side view of a vehicle depicting a fuel system in phantom, including a fuel tank.

Example embodiments will now be described more fully with reference to the accompanying drawings. With reference to FIGS. 1-6, fuel sender gage assembly 8 adaptable for use in fuel tanks with non-uniform interiors, such as fuel tanks with dome tops and/or bottoms, will be described. FIG. 1 depicts vehicle 10, such as an automobile, having engine 12, fuel supply line 14, fuel tank 16 and fuel pump module 18. Fuel pump module 18 mounts within fuel tank 16 with a flange and is normally submerged in or surrounded by varying amounts of liquid fuel within fuel tank 16 when fuel tank 16 possesses liquid fuel. A fuel pump within fuel pump module 18 pumps fuel to engine 12 through fuel supply line 14.

Figure 2:
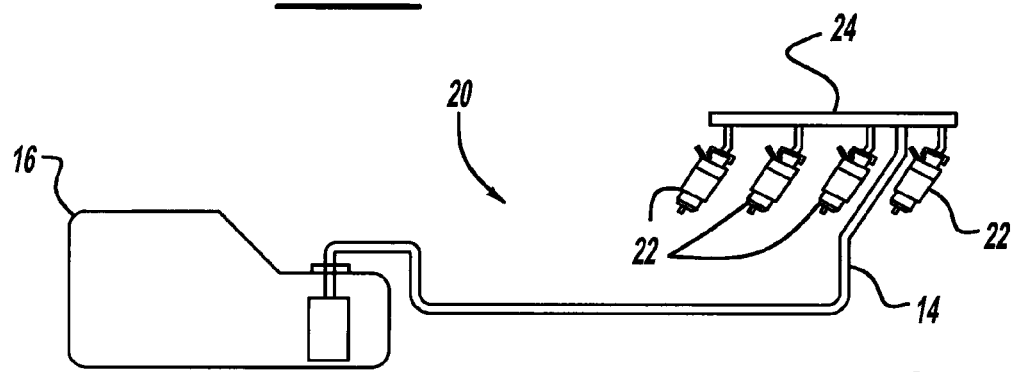
FIG. 2 is a side view of a vehicle fuel supply system depicting a fuel tank with a top that is not flat, but domed.

FIG. 2 is a perspective view of fuel supply system 20 depicting fuel injectors 22. In a fuel system such as a returnless fuel system, only fuel supply line 14 carries fuel between the fuel pump module 18 and a common fuel injector rail 24. Once the fuel reaches injector rail 24, also called a "common rail," as depicted in FIG. 2, the fuel passes into individual fuel injectors 22 before being sprayed or injected into individual combustion chambers of the internal combustion engine 12. The fuel supply system 20 has no fuel return line from injector rail 24 to fuel tank 16. The teachings of the present disclosure may be used in returnless fuel systems, such as a mechanical returnless fuel system ("MRFS"), or an electronic returnless fuel system ("ERFS"). The teachings may also be used with return fuel systems, or in other words, fuel systems with a return line to fuel tank 16.

Figure 3:
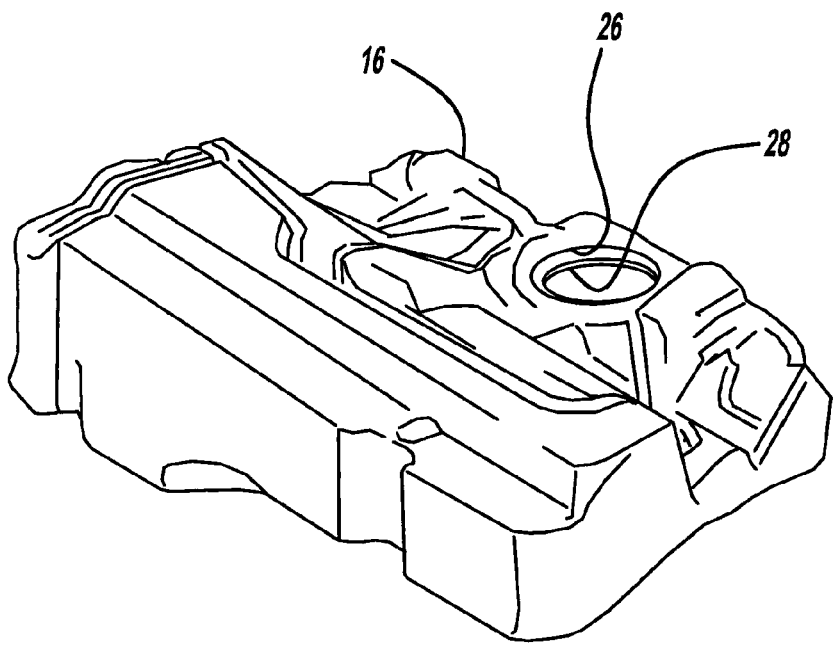
FIG. 3 is a perspective view of a fuel tank with a top that is not flat, but domed.
Figure 4:
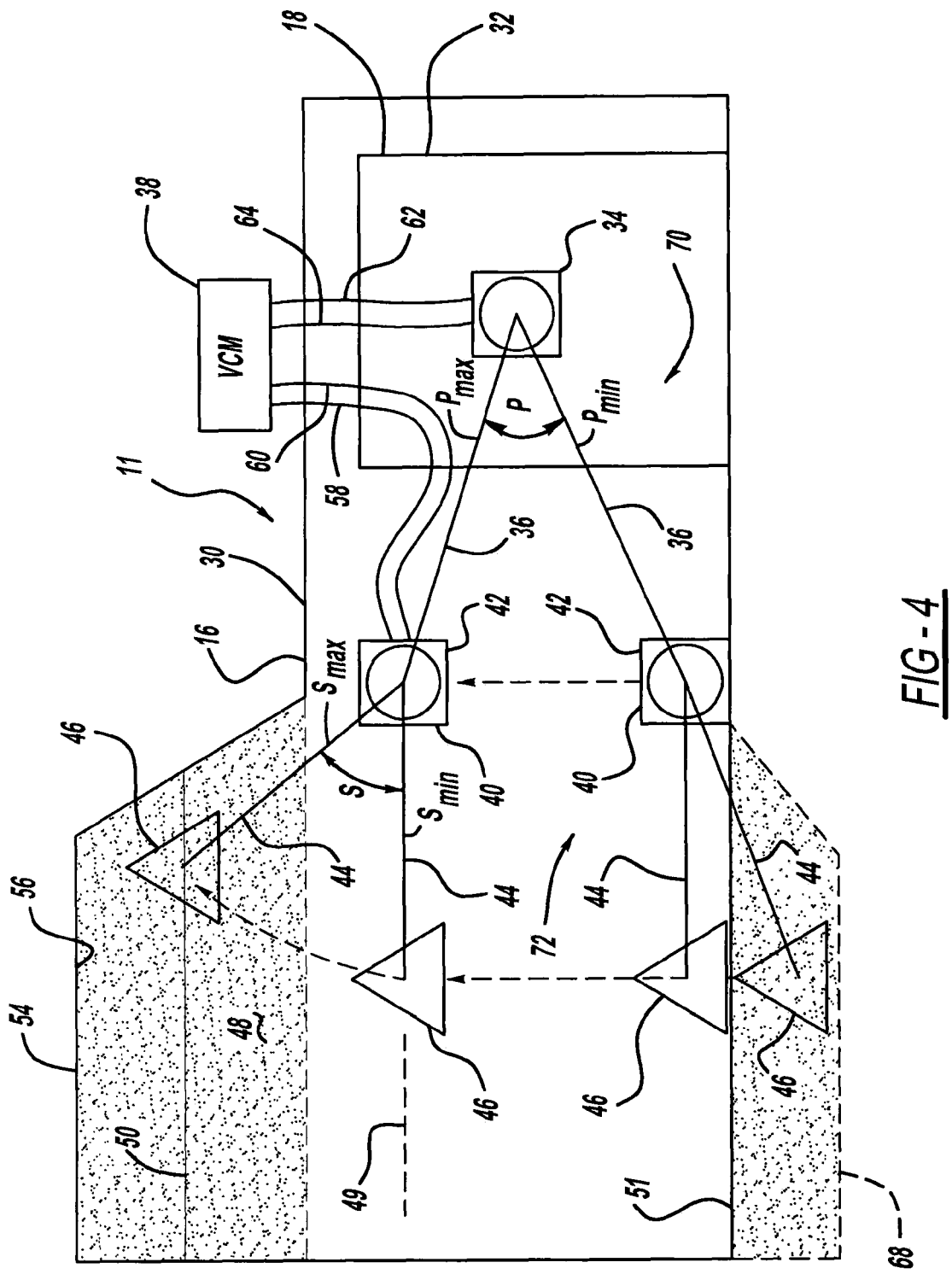
FIG. 4 is a side view of a domed fuel tank and a fuel gage assembly in accordance with the teachings of the present disclosure.

FIG. 3 is a perspective view of vehicle fuel tank 16 depicting mounting location 26 and hole 28. Mounting location 26, which may be a flat or flat and level mounting surface, may be used to mount a flange of fuel pump module 18. FIG. 4 depicts one embodiment of fuel pump module 18 that is in position after being lowered through hole 28 of fuel tank 16 in an installation technique. While FIG. 4 depicts fuel pump module 18 with its central axis situated or aligned vertically, so that an end of fuel pump module 18 is arranged against or parallel to a bottom of fuel tank 16; however, the teachings are applicable to a fuel pump module with its central axis arranged horizontally, that is, with a long side of fuel pump module reservoir 32 lying against a bottom of fuel tank 16.

Continuing with FIG. 4, primary sender gage 34, also referred to as a primary cluster gage or primary resistor gage, may be attached to a side of reservoir 32 of fuel pump module 18. Continuing, primary sender gage 34 has a primary sender arm 36 with a first end that rotates within primary sender gage 34. Primary sender arm 36 is typically a metal arm, which may be bent into particular configurations depending upon the fuel tank configuration or depth in order to achieve the most efficient "sweep" or floating motion possible within the fuel tank. Because primary sender arm 36 is typically a bent metal wire structure, when such wire arms become relatively long, flexing may be unpredictable, especially during fuel sloshing within tank 16. Therefore, wire arms are desired to be relatively short and thus keep flexing at a minimum and maintain fuel gage accuracy. Sender gages such as those attached to a fuel reservoir as depicted in FIG. 4, are known in the art, so a detailed explanation will not be provided; however, current passing through the primary sender gage 34 passes through a variable resistor whose resistance is changed by rotation of primary sender arm 36. As primary sender arm 36 rotates within primary sender gage 34, resistance of the variable resistor within primary sender gage 34 is altered, which alters a resistance signal sent to vehicle control module 38 ("VCM") which then may send a signal to a powertrain control module ("PCM") or engine control module ("ECM") and then to a vehicle dash where a dash indicator 66 (dash fuel gage) displays the fuel level in tank 16.

To cause primary sender arm 36 to rotate and pivot about its point of fixation in primary sender gage 34, a second end of the primary sender arm 36 is pivotably or fixedly attached to primary float 40. When no fuel or very little fuel is in fuel tank 16, primary float 40 may reside on the bottom interior of fuel tank 16, such as a flat bottom of a rectangular or square tank. While primary float 40 is just that, a float that is buoyant in liquid fuel, such as gasoline or diesel fuel as examples, primary float 40 is also secondary gage sender 42. Thus, primary float 40 and secondary gage sender are embodied in a single unit or case that is buoyant in liquid fuel. Because secondary gage sender 42 is a gage capable of measuring fuel levels, a first end of secondary sender arm 44 is affixed to secondary gage sender 42, such as in a fashion or method similar to how primary sender arm 36 is affixed to primary sender gage 34. Affixed to a second end of secondary sender arm 44 is a secondary sender float 46. As depicted in FIG. 4, when primary sender float 40 and secondary sender float 46 reside on bottom interior 51 of fuel tank 16, fuel tank 16 is empty or empty for practical purposes of supply fuel to engine 12. Accordingly, primary gage sender 34 and secondary gage sender 42 each send resistance signals to VCM 38 indicating an empty fuel tank, thus ultimately causing a vehicle fuel gage to indicate or display "empty" or "E."

Continuing with FIG. 4, when fuel tank 16 contains an amount of fuel at fuel level 49, which may be about 75-80% full with respect to the generally rectangular portion of fuel tank 16 (between top 30 and bottom 51) for example, the fuel level indicator on a vehicle dash may indicate "full" or "F" when in fact fuel tank 16 is not full. This phenomenon occurs because the primary float 40, which is the fuel level indicator for primary sender gage 34, can not raise any further due to the "L-shaped" or non-rectangular overall tank design of fuel tank 16. Thus, when liquid fuel occupies top dome area 48, depicted with shading in FIG. 4, primary sender float 40 does not rise any further than level 49. Primary sender arm 36 may be designed to stop rotation or movement at fuel level 49 so that primary sender float 40 does not contact top 30 of fuel tank 16, as depicted in FIG. 4.

Because the present teachings provide a secondary gage sender 42 and a primary sender float 40 in a single unit capable of floating in liquid fuel, fuel levels higher than, or above, fuel level 49 may be read by secondary gage sender 42, secondary sender arm 44 and secondary sender float 46. More specifically, when liquid fuel rises above fuel level 49, and even when fuel occupies top dome area 48, secondary sender float 46 will continue to rise up to, as an example, fuel level 50. Because secondary sender float 46 and secondary sender arm 44 are utilized by secondary sender gage 42, the level of fuel above fuel level 49, such as up to fuel level 50, may be displayed on a vehicle dash fuel gage after such fuel level above fuel level 49 is measured by secondary sender gage 42. The combination of secondary sender float 40 and secondary sender gage 42 in a single floating unit permits measurement of fuel levels above level 49, for example, and into domed tank areas such as top dome area 48 and bottom dome area 68, which protrudes below, and has a surface that is parallel to, tank bottom 51.

Secondary sender gage 42 works similarly to primary sender gage 34, and more specifically, secondary sender gage 42 operates by sending a signal in accordance with a varying resistance as measured by a variable resistor as secondary sender arm rotates in accordance with arrow 52 as secondary sender float 46 rises with the fuel level from tank bottom 51 to the maximum amount as permitted by rotational settings of primary sender gage 34 and secondary sender gage 42. Rotational settings of primary sender gage 34 and secondary sender gage 42 may be predetermined depending upon the specific dimensions of a fuel tank, such as fuel tank 16. For instance, angle P, may be the angle through which primary sender arm 36 may rotate from a position on or near fuel tank bottom 51 to fuel level 49. Similarly, angle S, may be the angle through which secondary sender arm 44 may rotate from a position at fuel level 49 to a position at fuel level 50. Secondary sender arm 44 may move or translate with primary sender float 40 and secondary sender float 46 from a position on or near fuel tank bottom 51 to fuel level 49.

Figure 5:
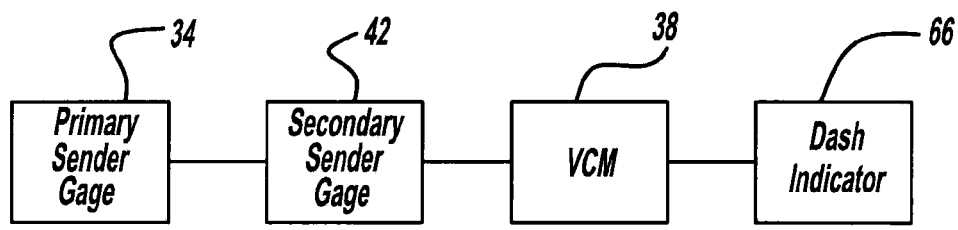
FIG. 5 is a schematic of the control of the fuel gage assembly.
Figure 6:
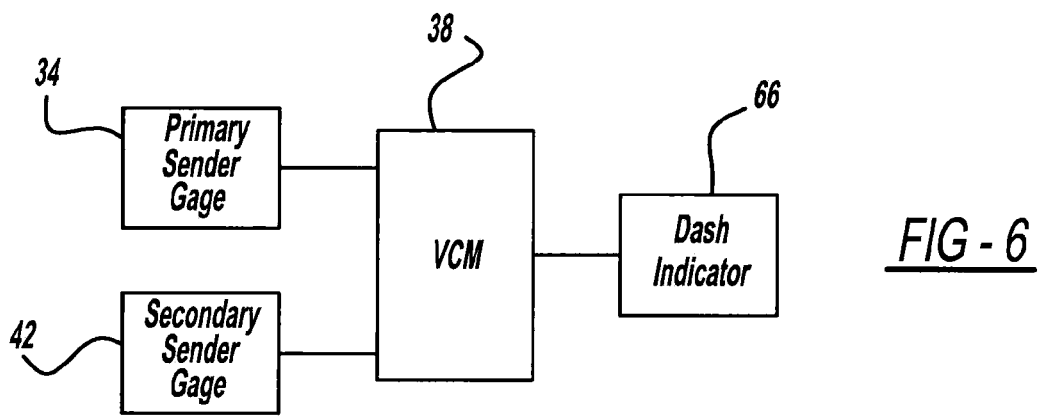
FIG. 6 is a schematic of the control of the fuel gage assembly.
Figure 7:
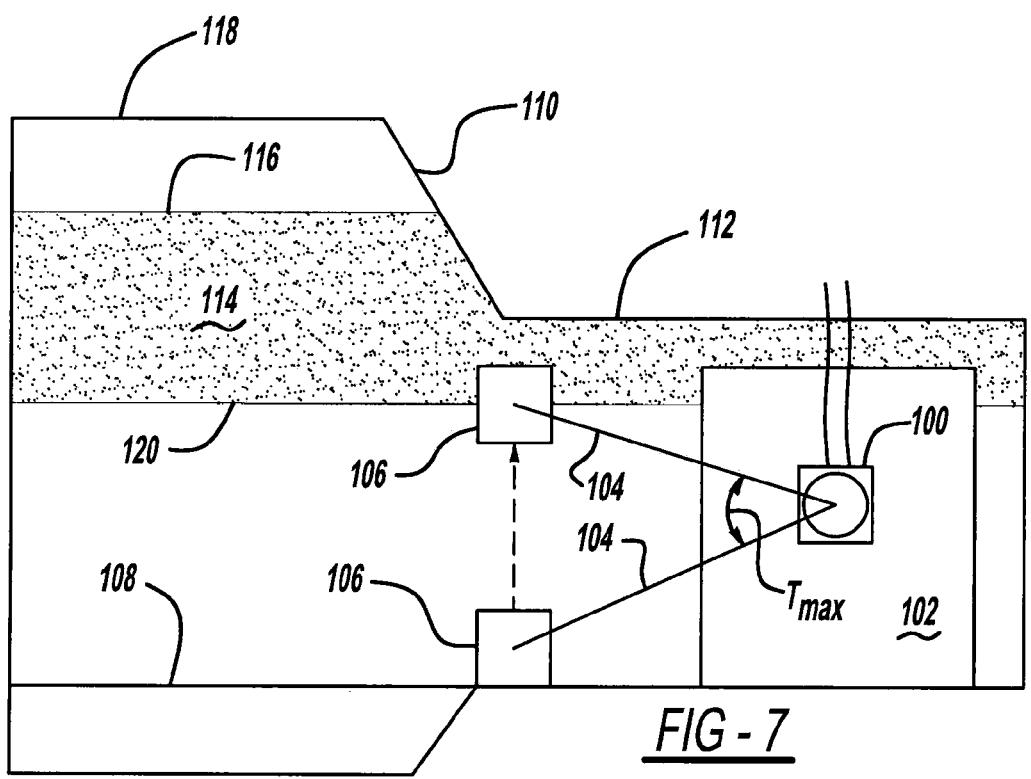
FIG. 7 is a side view of a prior art fuel gage assembly.

With reference primarily to FIGS. 4-6, further operation of fuel sender gage assembly 8 will be presented. Measuring a fuel level within fuel tank 16 from an empty condition through to fuel level 49 may be accomplished by a primary sender gage assembly 70, which may include primary sender gage 34, primary sender arm 36 and primary sender float 40. The secondary sender gage assembly 72, which may include secondary sender gage 42, secondary sender arm 44 and secondary sender float 46, floats upon or with the level of fuel up to fuel level 49, but measurements from secondary sender gage 42 may not be utilized until the fuel level within fuel tank 16 rises above the maximum limit of measurement of the primary sender gage 34, which is at Pmax or the largest angle from Pmin to Pmax for which primary sender arm 36 of primary sender gage 34 is configured to rotate. A signal is generated by secondary sender gage 42 before the level of fuel rises to level 49 and after the level of fuel rises above level 49, and even when the level of fuel rises into dome area 48 of the fuel tank dome 54, such as against top wall 56 of fuel tank dome 54. The signal may be ignored or disregarded until the arm 36 reaches Pmax. Similar to primary sender gage 34, secondary sender arm 44 connected to secondary sender gage 42 rotates from angle Smin to angle Smax.

Primary sender gage 34 and secondary sender gage 42 both outputs electrical signals to VCM 38. Primary sender gage 34 outputs signals to VCM 38 utilizing communication wires or communication lines 58, 60 while secondary sender gage 42 outputs signals to VCM 38 utilizing communication lines 62, 64. Generally, one of two methods may be used to process signals from primary sender gage 34 and secondary sender gage 42. The first method is parallel signal processing and the second method is serial signal processing. The preferred method regarding the present teachings is parallel signal processing in which signals from both primary sender gage 34 and secondary sender gage 42 are both communicated to VCM 38 and possibly another control module, such as an ECM or a PCM, as mentioned above, and further processed before sending a signal to dash indicator 66 or a fuel gage located in the vehicle dash thereby instructing dash indicator what to display in terms of a fuel level.

Fuel tank 16 depicted in FIG. 4 exemplifies a fuel tank with fuel tank dome 54, which is a portion of fuel tank 16 that rises above or beyond a basic square or rectangular fuel tank, which tank bottom 51, which may be flat and level, and tank top 30, which may be parallel to tank bottom 51, may partially form. However, instead of, or in addition to fuel tank dome 54, which is depicted in FIG. 4 as a top dome, fuel tank bottom dome 68 is conceivable and may exist as depicted in FIG. 4. A top dome is referred to as such because it exists on top of fuel tank 16, considering how fuel tanks are typically installed in a vehicle. That is, a top dome normally protrudes from that surface of a fuel tank farthest from the ground upon which a vehicle rests. A bottom dome may protrude from that surface of a fuel tank closest to the ground, which is a wall of the fuel tank on an opposing side of the tank from which the top dome protrudes.

What has been described then is a multiple joint fuel level measuring system 11 employing a primary sender gage assembly 70 and a secondary sender gage assembly 72. The primary sender gage 34 is a first joint at which primary sender arm 36 pivots and secondary sender gage 42 is a second joint at which secondary sender arm 44 pivots. Thus, fuel level measuring system 11 is a multi-joint system with joints being gages and gages being joints. The primary sender gage assembly 70 may at least employ a primary sender gage 34, a primary sender arm 36, and a primary sender float 40. The secondary sender gage assembly 72 may employ at least a secondary sender gage 42, a secondary sender arm 44, and a secondary sender float 46. The primary sender float 40 and the secondary sender gage 42 may be a single, buoyant unit, such as a unit encapsulated or confined in a fuel-resistant plastic case. The primary sender gage assembly 70 and the secondary sender gage assembly 72 are located within fuel tank 16, which may have a top dome portion 54 and/or a bottom dome portion 68. The secondary sender float 46 is capable of occupying the top dome portion 54 or the bottom dome 68 portion depending upon a level of fuel in fuel tank 16. A vehicle control module 38 may be connected to a first set of communication wires 58, 60 that transmit resistivity levels (i.e. signals) between the primary sender gage 34 and the vehicle control module 38, and a second set of communication wires 62, 64 to transmit resistivity levels (i.e. signals) between the secondary sender gage 42 and vehicle control module 38. A dash indicator 66 may display a fuel level of fuel, regardless of the fuel level within the fuel tank 16.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A fuel level measuring system comprising:
  a primary sender gage assembly comprising:
    a primary sender gage;
    a primary sender arm; and
    a primary sender float;
  a secondary sender gage assembly comprising:
    a secondary sender gage;
    a secondary sender arm; and
    a secondary sender float, wherein the primary sender float and the secondary sender gage are a single unit.

2. The fuel level measuring system of claim 1, wherein the primary sender float and the secondary sender gage are a single buoyant unit.

3. The fuel level measuring system of claim 1, further comprising:

a fuel tank, wherein the primary sender gage assembly and the secondary sender gage assembly are located within the fuel tank.

4. The fuel level measuring system of claim 1, further comprising:
a top dome portion of the fuel tank, wherein the secondary sender float occupies the top dome portion.

5. The fuel level measuring system of claim 1, further comprising:
a bottom dome portion of the fuel tank, wherein the secondary sender float occupies the bottom dome portion.

6. The fuel level measuring system of claim 1, further comprising:
a vehicle control module;
a first set of communication wires to transmit resistivity levels between the primary sender gage and the vehicle control module; and
a second set of communication wires to transmit resistivity levels between the primary sender gage and the vehicle control module.

7. The fuel level measuring system of claim 1, further comprising:
a dash indicator to display a fuel level of fuel within the fuel tank.

8. A fuel level measuring system for a fuel tank, comprising:
a primary sender gage assembly comprising:
a primary sender gage;
a primary sender arm; and
a primary sender float;
a secondary sender gage assembly comprising:
a secondary sender gage;
a secondary sender arm;
a secondary sender float; and
a fuel tank top dome portion, wherein the primary sender float and the secondary sender gage are a single buoyant unit, the secondary sender float capable of measuring fuel levels in the fuel tank dome portion.

9. The fuel level measuring system of claim 8, wherein the primary sender gage assembly and the secondary sender gage assembly are located within the fuel tank.

10. The fuel level measuring system of claim 9, further comprising:
a vehicle control module;
a first set of communication wires to transmit resistivity levels between the primary sender gage and the vehicle control module; and
a second set of communication wires to transmit resistivity levels between the primary sender gage and the vehicle control module.

11. The fuel level measuring system of claim 10, further comprising:
a dash indicator to display a fuel level of fuel within the fuel tank.

12. The fuel level measuring system of claim 11, further comprising:
a bottom dome portion of the fuel tank, wherein the secondary sender float occupies the bottom dome portion.

13. A fuel level measuring system for a fuel tank, comprising:
a primary sender gage assembly comprising:
a primary sender gage;
a primary sender arm; and
a primary sender float;
a secondary sender gage assembly comprising:
a secondary sender gage;
a secondary sender arm;
a vehicle control module; and
a secondary sender float,
a first set of communication wires to transmit resistivity levels between the primary sender gage and the vehicle control module;
a second set of communication wires to transmit resistivity levels between the primary sender gage and the vehicle control module; and
a dash indicator to display a fuel level of fuel within the fuel tank, wherein the primary sender float and the secondary sender gage are contained within a single unit that is buoyant in gasoline.

14. The fuel level measuring system of claim 13, wherein the primary sender gage assembly and the secondary sender gage assembly are located within the fuel tank.

15. The fuel level measuring system of claim 14, further comprising:
a top dome portion of the fuel tank, wherein the secondary sender float occupies the top dome portion.

16. The fuel level measuring system of claim 15, further comprising:
a bottom dome portion of the fuel tank, wherein the secondary sender float 46 occupies the bottom dome portion.

17. The fuel level measuring system of claim 16, further comprising:
a vehicle control module;
a first set of communication wires to transmit resistivity levels between the primary sender gage and the vehicle control module; and
a second set of communication wires to transmit resistivity levels between the primary sender gage and the vehicle control module.

18. The fuel level measuring system of claim 17, further comprising:
a dash indicator to display a fuel level of fuel within the fuel tank.

* * * * *